Oct. 8, 1940.  B. POLL  2,216,923
PLANTING MACHINE
Filed June 5, 1939  2 Sheets-Sheet 1

Witness:-
John E Braddock

Inventor
Benjamin Poll
By Rice and Rice
Attorneys

Oct. 8, 1940.   B. POLL   2,216,923
PLANTING MACHINE
Filed June 5, 1939   2 Sheets-Sheet 2
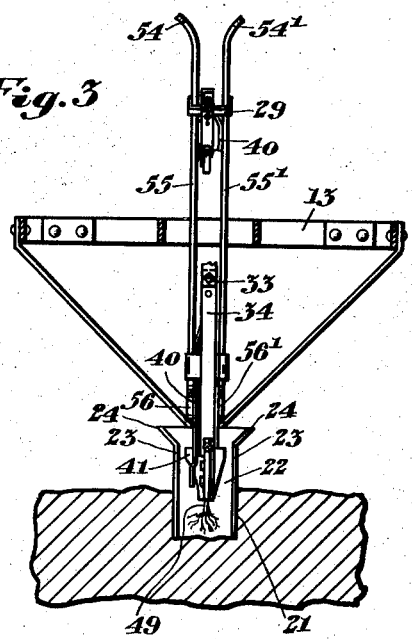
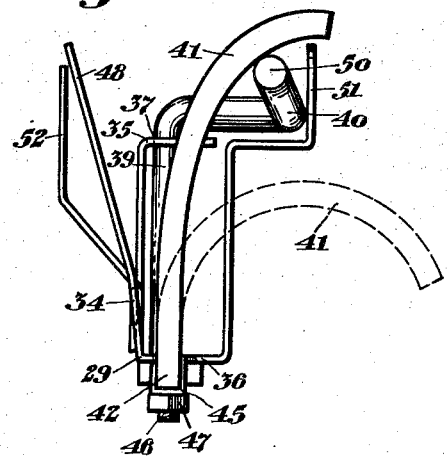
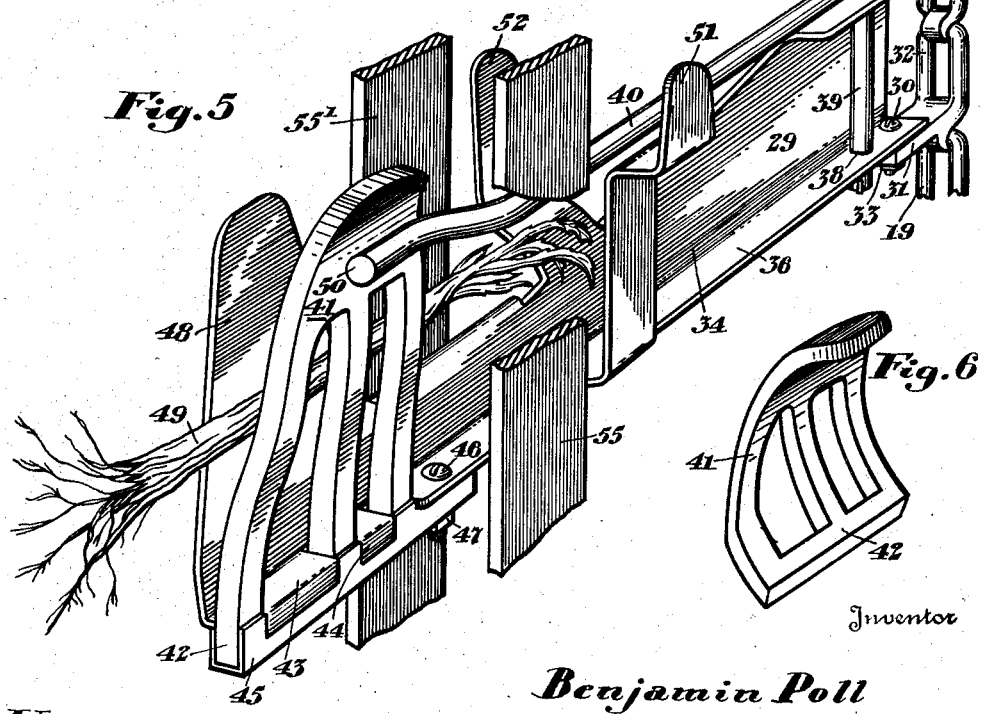
Witness:-
John S. Braddock
Inventor
Benjamin Poll
By Rice and Rice
Attorneys Patented Oct. 8, 1940

2,216,923

UNITED STATES PATENT OFFICE 2,216,923

PLANTING MACHINE

Benjamin Poll, Holland, Mich.

Application June 5, 1939, Serial No. 277,359

4 Claims. (Cl. 111—3)

The present invention relates to planting machines for setting plants in the ground and packing earth about their roots. The machine herein shown and described is of the type shown in Patent No. 1,888,143, issued November 15, 1932, to Louis Poll, and more especially of the type shown in Patent No. 2,003,390, issued June 4, 1935, jointly to Louis Poll and the present applicant.

The primary objects of this invention are to provide improved plant holder units for machines of the type shown in the patents above referred to and to provide improved means for releasably holding the plants in such units.

An illustrative embodiment of the invention is shown in the accompanying drawings, wherein:

Figure 3 is a sectional view thereof on line 3—3 of Figure 2;

Figure 4 is an enlarged end elevational view of one of the plant holder units of the machine; and Figure 5 is a view in perspective of one of the plant holder units of the machine with a plant held therein, portions of the machine being shown fragmentarily.

Figure 6 is a perspective view of a flexible element forming part of one of the plant holder units.

Figure 1:
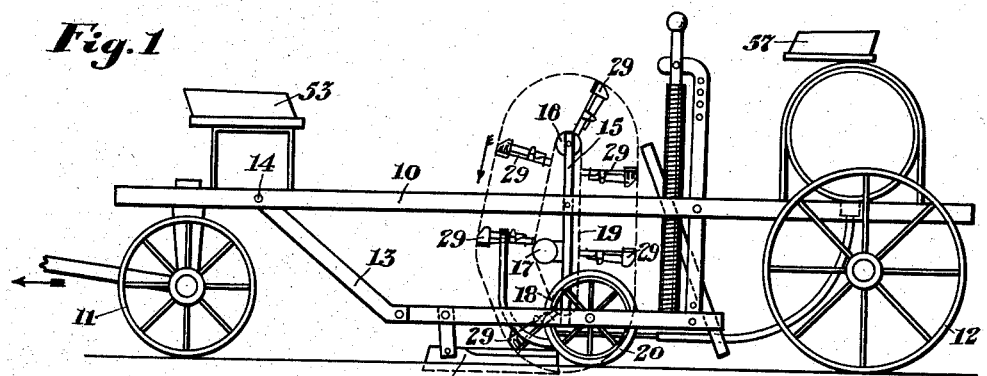
Figure 1 is a side elevational view of a planting machine.

Referring to these drawings in which like parts are designated by the same numerals in the several views, the machine there shown for setting small plants, such as celery, onion, strawberry plants and the like, in a furrow and packing earth about their roots generally comprises a main frame 10 supported by forward vehicle wheels 11 and rearward vehicle wheels 12. A subframe 13 is pivotally mounted at 14 on the main frame so as to be raised and lowered relatively thereto to vary the planting depth of the plants, this subframe carrying the planting or setting mechanism.

A vertical post comprising parallel members 15 is carried by the subframe 13, on which post are rotatably mounted vertically spaced sprocket wheels 16, 17, 18 whose axes extend horizontally and transversely of the subframe. A carrier, the belt or sprocket chain 19, is mounted on these sprocket wheels 16, 17, 18.

A pair of earth-packing wheels 20 are disposed on the opposite sides of the furrow 21 in which the plants are set, which furrow is formed in the forward travel of the machine by the plow shoe 22 having opposite sides 23 with diverging upper portions 24. The spindle axles of these packing wheels 20 are inclined so that the rims of the wheels are upwardly convergent at their bottoms for closing the furrow 21 in a manner well known in the art.

Figure 2:
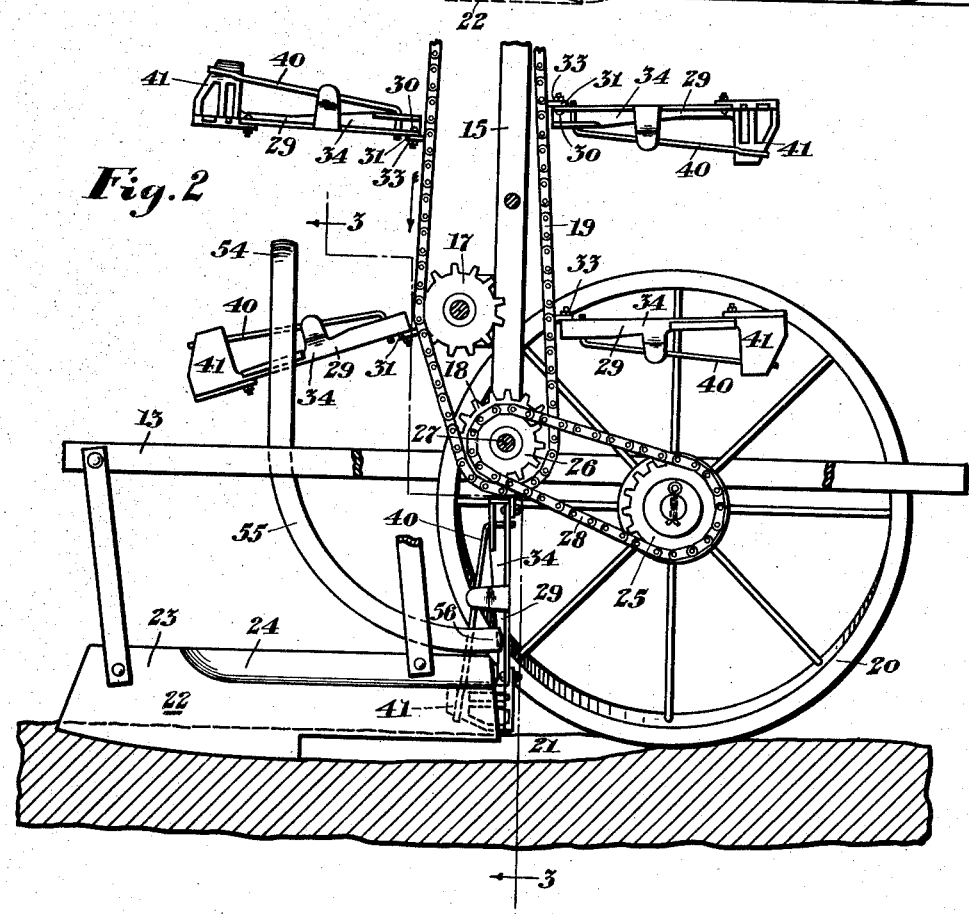
Figure 2 is an enlarged fragmentary side elevational view of lower middle parts of the machine, certain parts being shown broken away to expose the parts beyond.

At least one of said packing wheels 20, and preferably both, has a sprocket wheel 25 on which and on a sprocket wheel 26 on the rotatable axle 27 of the sprocket wheel 18, is carried a sprocket chain 28, so said wheel 18 and the sprocket chain 19 are driven in the direction indicated in Figures 1 and 2 by the rotation of the packing wheels 20 as the machine travels forwardly over the field.

Plant holders 29 are spacedly mounted on the chain or carrier 19 and extend outwardly therefrom as particularly well seen in Figure 2. These holders are desirably mounted as detachable units on the chain—for ready replacement or repairing—as by threaded bolts 30 passing therethrough and through arms 31 of some of the links 32 of said chain as shown in Figure 5, these bolts having nuts 33.

Said plant holders comprise a main arm 34 whose rearward end portion adjacent the chain 19 is channel shaped to form spaced flanges 35, 36 having aligned bearings 37, 38 therein in which is freely turnably disposed a laterally turned portion 39 of a second arm 40 which projects outwardly from the chain 19 in the same general direction as the main arm 34.

The flange 36 is provided with flanged portions 43, 44 and a flexible element 41 of rubber, rubberized fabric such as is used for ordinary garden hose, or the like has a base portion 42 secured to the outer end of the arm 29 between the flanges 43, 44 of said arm and a channel member 45 secured to the flange 36 of the arm by means of a bolt 46 passing therethrough and provided with a nut 47. This flexible element 41 has a normally curled shape as shown in Figure 6 and as indicated in dotted lines in Figure 4, and forms with the enlarged end 48 of arm 29 a normally open pocket adapted to receive a plant 49.

The outer end 50 of arm 40 engages the flexible element 41 and is urged by said flexible element away from the pocket. A finger 51 on the arm 29 serves as a stop to limit the flexing of the element 41 and the movement of arm 40 to their positions shown in Figure 4 wherein the pocket is open to receive the root end portion of a plant. A second finger 52 is provided on arm 29 opposite the finger 51, these fingers being adapted to loosely support and confine therebetween the leaf end portions of the plant.

As shown, these plant holders are so mounted on chain 19 that the flexible elements 41 are alternately toward the opposite sides of the machine, which arrangement facilitates the insertion of plants into every other one of the holders by one operator and into the intervening holders by another operator, these operators sitting side by side on the rearwardly facing seat 53.

As the chain 19 is driven in the indicated direction the operators insert plants into the pockets of the holders with their root ends outwardly. As each plant holder is carried by the travel of the chain to a position wherein its arm 40 engages the upper end 54 or 54¹ of a curved plate or cam member 55 or 55¹ on the subframe 13 of the machine, this arm is thereby swung laterally toward the pocket thus lightly but sufficiently clamping the plant yieldingly in the pocket as seen in Figure 5. When the plant holder passes beyond the lower end 56 or 56¹ of said plate or cam member, the arm 40 is released and the flexible element 41 is permitted to flex outwardly thus opening the pocket and releasing the plant whereupon the plant is immediately fixed firmly in the ground by the wheels 20 which pack the earth about its root and the furrow is thus closed.

Any means may be employed to travel the machine over the ground. In the shown construction the machine is horse drawn, the driver sitting on the rear seat 57.

While but one specific embodiment of the invention has been herein shown and described, it will be understood that certain details of the construction shown may be altered or omitted without departing from the spirit of this invention as the same is defined by the following claims.

I claim:

1. In a planting machine, a carrier having a circuitous movement, a plurality of plant holders mounted in spaced relation on the carrier, each plant holder comprising an arm extending at right angles to the direction of movement of the carrier, a flexible member secured at one end thereof to said arm and forming therewith a normally open pocket adapted to receive a plant, a second arm freely turnably mounted on the first arm and engaging adjacent the free end of the flexible member, and means in the path of the movement of each plant holder for turning the second-mentioned arm toward the pocket, thus flexing said flexible member to close the pocket and yieldingly hold said plant therein.

2. In a planting machine, a carrier having a circuitous movement, a plurality of plant holders mounted in spaced relation on the carrier, each plant holder comprising an arm extending at right angles to the direction of movement of the carrier, a flexible member secured at one end thereof to said arm and forming therewith a normally open pocket adapted to receive a plant, a second arm freely turnably mounted on the first arm and engaging adjacent the free end of the flexible member, means in the path of the movement of each plant holder for turning the second-mentioned arm toward the pocket, thus flexing said flexible member to close the pocket and yieldingly hold said plant therein, and a stop on the first-mentioned arm for limiting movement of the second-mentioned arm away from said pocket.

3. In a planting machine, a carrier having a circuitous movement, a plurality of plant holders mounted in spaced relation on the carrier, each plant holder comprising an arm extending at right angles to the direction of movement of the carrier, a flexible member secured to said arm and forming therewith a normally open pocket adapted to reveive a plant, a second arm freely turnably mounted on the first arm and engaging the flexible member, means in the path of the movement of each plant holder for turning the second-mentioned arm toward the pocket, thus flexing said flexible member to close the pocket and yieldingly hold a portion of said plant therein, and a pair of laterally extending fingers on the first-mentioned arm adapted to loosely support another portion of said plant therebetween.

4. In a planting machine, a carrier having a circuitous movement, a plurality of plant holders mounted in spaced relation on the carrier, each plant holder comprising an arm extending at right angles to the direction of movement of the carrier, a flexible member secured to said arm and forming therewith a normally open pocket adapted to receive a plant, a second arm freely turnably mounted on the first arm and engaging the flexible member, means in the path of the movement of each plant holder for turning the second-mentioned arm toward the pocket, thus flexing said flexible member to close the pocket and yielding hold a portion of said plant therein, and a pair of laterally extending fingers on the first-mentioned arm adapted to loosely support another portion of said plant therebetween, one of said fingers serving further as a stop for limiting movement of the second-mentioned arm away from said pocket.

BENJAMIN POLL.